United States Patent
Abernethy, Jr. et al.

(10) Patent No.: US 7,856,626 B2
(45) Date of Patent: Dec. 21, 2010

(54) METHOD OF REFACTORING METHODS WITHIN AN APPLICATION

(75) Inventors: Michael Negley Abernethy, Jr., Pflugerville, TX (US); Travis M. Grigsby, Austin, TX (US); Syed-Muasir Khalil, Austin, TX (US); Truong-An Hoan Thai, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 1366 days.

(21) Appl. No.: 11/340,445

(22) Filed: Jan. 26, 2006

(65) Prior Publication Data
US 2007/0198697 A1 Aug. 23, 2007

(51) Int. Cl.
*G06F 9/45* (2006.01)
*G06F 9/44* (2006.01)

(52) U.S. Cl. .......... 717/151; 717/116; 717/121; 717/162

(58) Field of Classification Search .......... None
See application file for complete search history.

(56) References Cited

U.S. PATENT DOCUMENTS

| 6,715,100 | B1 | 3/2004 | Hwang | |
| 7,013,459 | B2 * | 3/2006 | Kuch et al. | 717/158 |
| 2002/0049603 | A1 * | 4/2002 | Mehra et al. | 705/1 |
| 2003/0005028 | A1 | 1/2003 | Dritschler et al. | |
| 2003/0023722 | A1 | 1/2003 | Vinberg | |
| 2006/0031838 | A1 * | 2/2006 | Chrabieh | 718/100 |
| 2007/0061792 | A1 * | 3/2007 | Atsatt | 717/151 |
| 2007/0061793 | A1 * | 3/2007 | Inglis et al. | 717/151 |

OTHER PUBLICATIONS

"Refactoring the JUnit framework using aspect-oriented programming", Kulesza et al., Oct. 2005, pp. 136-137, <http://delivery.acm.org/10.1145/1100000/1094901/p136-kulesza.pdf>.*

"Challenges of refactoring C programs", Garrido et al., May 2002, pp. 6-14, <http://delivery.acm.org/10.1145/520000/512039/p6-garrido.pdf>.*

"Refactoring support for class library migration", Balaban et al., Oct. 2005, pp. 265-279, <http://delivery.acm.org/10.1145/1100000/1094832/p265-balaban.pdf>.*

* cited by examiner

*Primary Examiner*—Thuy Dao
(74) *Attorney, Agent, or Firm*—Yee & Associates, P.C.; David A. Mims, Jr.

(57) ABSTRACT

A computer implemented method, apparatus, and computer usable program code for refactoring methods of an application. A rating for a method within the application is identified to form a rated method. The rated method is placed in a grouping based on the rating identified for the method. A data processing system is designated to process the grouping.

9 Claims, 3 Drawing Sheets

US 7,856,626 B2

METHOD OF REFACTORING METHODS WITHIN AN APPLICATION

BACKGROUND OF THE INVENTION

1. Field of the Invention

The present invention relates generally to data processing, and in particular to a computer implemented method and apparatus for refactoring methods within applications. Still more particularly, the present invention relates to a computer implemented method, apparatus, and computer usable program code for automatically refactoring critical methods out of applications and moving them to servers based on critical ratings.

2. Description of the Related Art

Application programs are used to perform work, functions, and tasks on computing devices. All application programs are not created equal; some applications may be used for critical tasks while other applications may be for non-critical or superfluous tasks. For example, applications that perform transactions or communications between servers may be considered critical because the application is crucial to a businesses success or failure. For instance, an application that polls the Internet for entertainment news may be considered non-critical because the application may not be critical to a user or dependent business. Accordingly, each application may be assigned a rating or priority that designates the importance of the application to a user or other device. In some systems, each application may be processed and executed based on a designated rating.

In addition, applications are often composed of a wide array of methods. Each method may have a rating based on the method's importance to the success of the application. Although the rating of the method may vary drastically, the application itself may only have one rating. As a result, most data processing systems execute applications and methods based on the rating of the applications regardless of the rating of each method within the applications. As a result, critical methods within an application with a higher rating may be unduly delayed or postponed based on the lower rating of the application.

SUMMARY OF THE INVENTION

The aspects of the present invention provide a computer implemented method, apparatus, and computer usable program code for refactoring methods of an application. A rating for a method within the application is identified to form a rated method. The rated method is placed in a grouping based on the rating identified for the method. A data processing system is designated to process the grouping.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
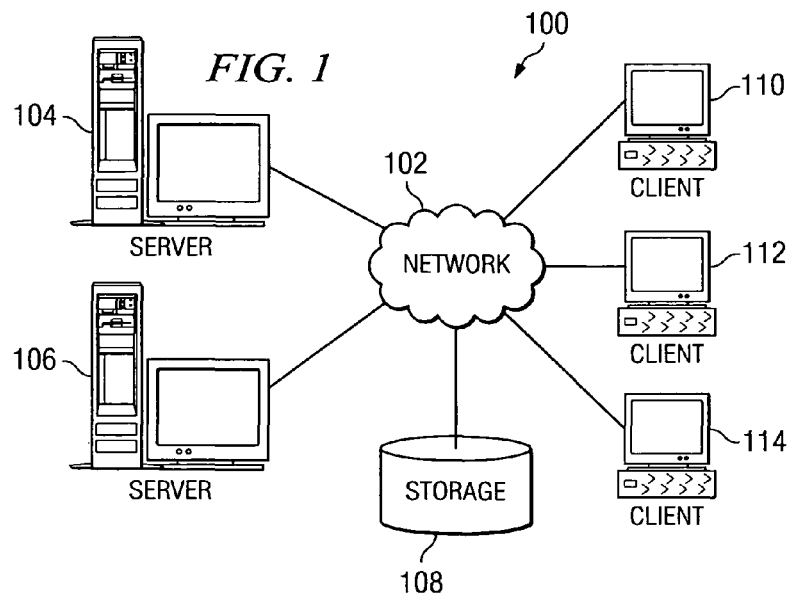
FIG. 1 is a pictorial representation of a data processing system in which the aspects of the present invention may be implemented.
Figure 2:
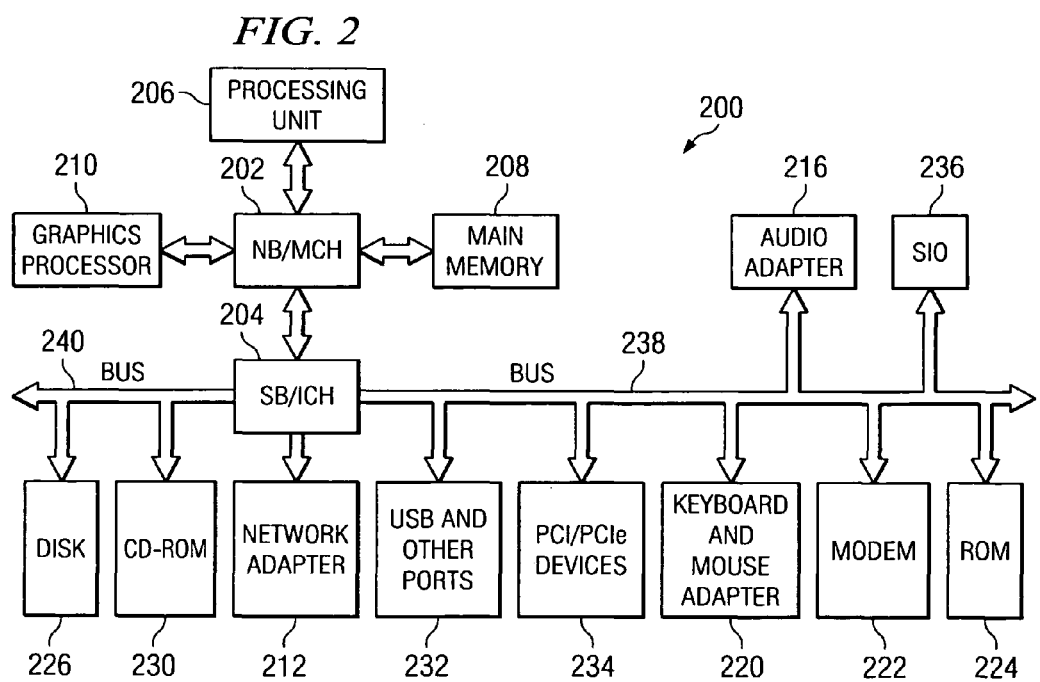
FIG. 2 is a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. Servers 104 and 106 may be a host device on mainframe computer accessible by numerous users through network 102. Storage unit 108 may be a database containing table space that may be accessed through network 102. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients or terminals to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both, while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs, are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or LAN adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The different aspects of the present invention provide a computer implemented method, apparatus, and computer usable program code for refactoring methods within application programs. A method refers to a callable section of code within a class or an object used to perform a specified task. The method may be an object, a function in a class, a programming procedure, or a sequence of statements. The application may be one or more application program, such as, any software program designed to perform a specific task or group of tasks, such as word processing, communications, or database management.

Aspects of the present invention recognize that applications, methods, new classes, and data processing system may each have a rating or critical rating. The critical rating is used to describe the priority or general importance of the element expressed in the form of a rating. For example, the critical rating of the method may be related to the method's importance to the functionality of the application, the importance of the task performed by the method, frequency of execution of the method, or the degree to which other methods may rely on the method. A set of rated methods is one or more methods with an assigned rating.

When one or more applications are deployed deployment management software categorizes methods within the applications into groups, groupings, or a set of groupings of methods based on the critical rating of each method. These groups are at least one group and are used to create new classes according to illustrative embodiments. The new classes include methods with similar critical ratings. Each new class is deployed to a designated computing device, such as a server for processing and execution. The number of groups and new classes may correspond to the number of servers.

Additionally, each computing device may be designated to process a new class based on the critical ratings of the methods within the new class. For example, if there are three different servers, the methods in the applications may be arranged into three groups such as high critical rating, medium critical rating, and low critical rating. Each group may be designated to one of the servers based on a critical rating of the server. The critical rating of the server may be based on capacity, performance, load, hardware architecture, or other designation or ability to process a designated new class. In the illustrative examples, critical ratings used to designate the importance of an application, method, new class, or server, may be any form of numerical or textual format.

Figure 3:
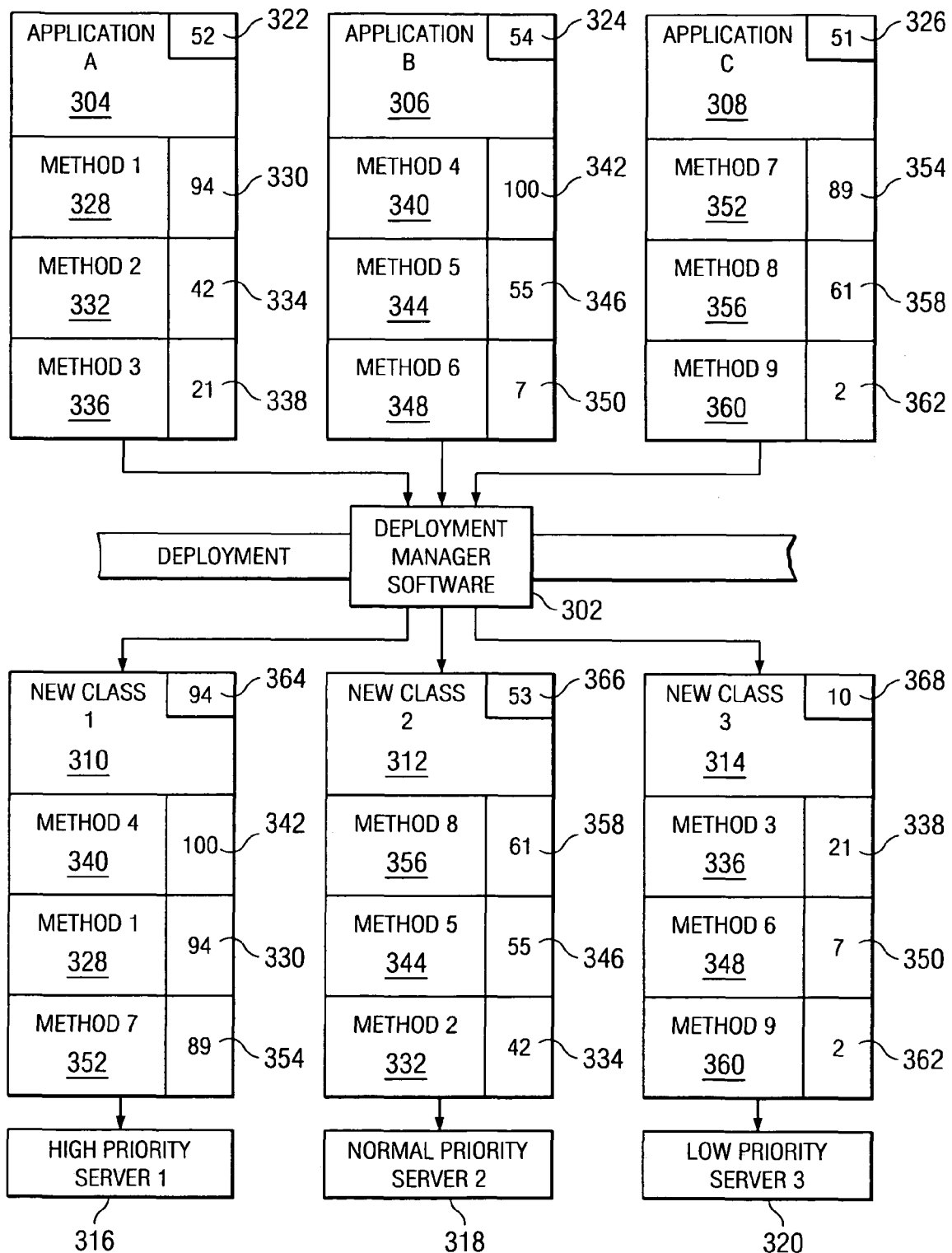
FIG. 3 is a block diagram of an application method refactoring system in accordance with an illustrative embodiment of the present invention.

FIG. 3 is a block diagram of an application method refactoring system in accordance with an illustrative embodiment of the present invention. Deployment manager software 302 refactors methods from application programs, such as application A 304, application B 306, and application C 308 into newly created classes. The new classes are, for example, new class 1 310, new class 2 312, and new class 3 314. Deployment manager software 302 may be stored and processed by a computing device, such as client 112 or server 104 of FIG. 1.

Refactoring is a regrouping or recategorizing of methods from various applications into new classes or grouped application bundles. The refactoring is based on the critical rating associated with each method as shown in these examples. In an illustrative embodiment, the new classes are created to include methods of similar importance, criticality, or priority. The number of new classes created may be user defined or automatically defined based on the number or availability of servers, such as server 1 316, server 2 318, and server 3 320.

Each application may be assigned a critical rating. For example, application A 304 is assigned critical rating 322 numerically designated 52, application B 306 is assigned critical rating 324 numerically designated 54, and application C 308 is assigned critical rating 326 numerically designated 51. The critical rating of each application may be designated in any number of ways. For example, the critical rating of each application may be assigned by the application developer, the average value of a critical value of the methods within the application as shown, a designated number between 1 and 100, or a textual designation, such as high priority, normal priority, and low priority.

Each method within the application may also have a critical rating. For example, within application A 304 method 1 328 has critical rating 330 numerically designated as 94, method 2 332 has critical rating 334 numerically designated as 42, and method 3 336 has critical rating 338 numerically designated as 21. In application B 306 method 4 340 has critical rating 342 numerically designated as 100, method 5 344 has critical rating 346 numerically designated as 55, and method 6 348 has critical rating 350 numerically designated as 7. In application C 308 method 7 352 has critical rating 354 numerically designated as 89, method 8 356 has critical rating 358 numerically designated as 61, and method 9 360 has critical rating 362 numerically designated as 2.

In an illustrative embodiment, the critical rating of each method may be specified by a developer. The critical rating may be dynamically changed by deployment manager software 302 as the methods are processed and executed. For example, deployment manager software 302 may use performance statistics to determine the applicable critical rating of a method based on information such as frequency of execution, dependencies, and execution time.

Data processing systems that process methods based solely on the critical rating of an application may induce execution inequities. For example, despite the numerical closeness of critical rating 322, critical rating 324, and critical rating 326, application B 306 may be treated preferentially because of critical rating 324 being the highest with the value of 54. Processing and execution of application A 304 and application B 306 may be performed in the background, delayed, or given secondary treatment even though critical rating 322 and critical rating 326 are nearly equivalent to critical rating 324.

To compensate for possible execution inequities, deployment manager software 302 may identify the critical rating of each method within deployed applications and then categorize the methods of application A 304, application B 306, and application C 308 at the time of deployment into groups. The groups are used to create new classes that may be sent for processing and execution on computing devices. Any number of methods may be within each application and new class.

For example, Java source files (.java files) may be compiled into byte code, which may be stored in class files. Each application may be separated into methods by examining the compiled byte code of the class file. The compiled byte code, as separated into methods, may be moved as a section of data and placed into a new class. References to the method that is being moved may reside in the same class, other classes in the class path, in a workload manager, a server side cache, or even on a client side such as an included web page. Each method reference is updated to point to the new location of the method within the new class. Because all of the method references reside in the scope of the application server in which the refactored method resides, changing and updating the references is not difficult and may be done by the deployment manager software as it refactors the desired method.

Applications may be run on different servers by providing metadata to the application servers running the applications. Metadata is information about a particular data set which may describe, for example, how, when, and by whom it was received, created, accessed, and/or modified and how it is formatted. This metadata provides pointers to the classes and methods that are available in the application and allow the application server to route calls to the method to the right server and the right class. For example, if applications are running on different servers, the metadata provides a directory to all the available methods. When a method is refactored, the metadata is updated, and by updating these directories, all of the pointers to the methods are kept current and correct. The updated metadata allows a direct call to a specified method within an application to be updated with a referential call to the same method refactored into a new class.

Deployment manager software 302 categorizes the methods from the applications into new class 1 310, new class 2 312, and new class 3 314. Each new class may be assigned methods that may have been grouped according to the critical rating of each method and the number of servers available to process the new classes. For example, if three servers are available to process and execute methods, the methods may be classified into three groups, high critical rating, normal critical rating, and low critical rating. Of course other numbers of ratings and types may be used depending on the particular implementation.

In one illustrative embodiment, the range of critical ratings of the methods may be from 1-100 with critical ratings 66-100 considered most important, 65-33, considered normal importance, and 32-1 considered low importance. The methods may be grouped using various techniques and structures. For example, methods may be monitored in order to compile statistics indicating which methods should be grouped. Method statistics may include, for example, response time, method duration, processor usage, and memory usage. In one example, methods may be grouped into short duration methods and long duration methods.

Additionally, methods may be grouped based on physical location needs, database needs, lightweight directory access protocol server needs server needs, and message server needs. Lightweight directory access protocol defines a standard for organizing directory hierarchies and interfacing to directory servers. This protocol enables users to locate people, organizations, and other resources in an Internet directory or intranet directory. In one illustrative example of physical location needs, a method includes a checkZipCode( ) function that verifies a zip code in the United States that the method should reside on a server in the United States and not on a server in Europe.

For example, new class 1 310 includes the methods with the highest or most important critical ratings from application A 304, application B 306, and application C 308. As shown, new class 1 310 includes method 4 340, method 1 328, and method 7 352. New class 1 310 may include a newly calculated critical rating 364 computed by deployment manager software 302. Critical rating 364 may be the average of the methods inserted in new class 1 310 including critical rating 342 of method 4 340, critical rating 330 of method 1 328, and critical rating 354 of method 7 352.

New class 2 312 may include critical rating 366, the average of the critical ratings of method 8 356, method 5 344, and method 2 332. New class 3 314 may include critical rating 368, the average of the critical ratings of method 3 336, method 6 348, and method 9 360.

As a result of categorizing the methods of the original applications, instead of three applications with nearly identical critical ratings, deployment manager software 302 creates new classes with more distinguishable critical ratings. For example, new class 1 310 now has critical rating 364 of 94 compared with application B 306 that had the highest critical rating 324 of 54 among the different applications.

New class 1 310 may now be deployed to server 1 316. Server 1 316 may especially accommodate new classes with highly critical methods. For example, server 1 316 may have more processing power and speed, a better hardware architecture, a lighter load, may be physically closer to a database, or other features or abilities that make deploying the methods of new class 1 310 to server 1 316 desirable. Server 2 318 may adequately process more methods with a normal critical rating, such as the methods of new class 2 312. Server 3 320 may be used to process methods with a low priority, such as the methods of new class 3 314. The new classes may be deployed to computing devices or servers over a network, such as network 102 of FIG. 1.

Processing methods based on the critical rating of the entire application separates methods, such as method 1 328, method 4 340, and method 7 352 even though their respective critical ratings are numerically very similar. Illustrative embodiments of the present invention allow method 1 328, method 4 340, and method 7 352 to be effectively grouped into new class 1 310 so that these methods are processed in with greater priority and preferential structure. As a result, performance of the overall application on which the methods are based improves, which may increase system performance and user satisfaction.

Figure 4:
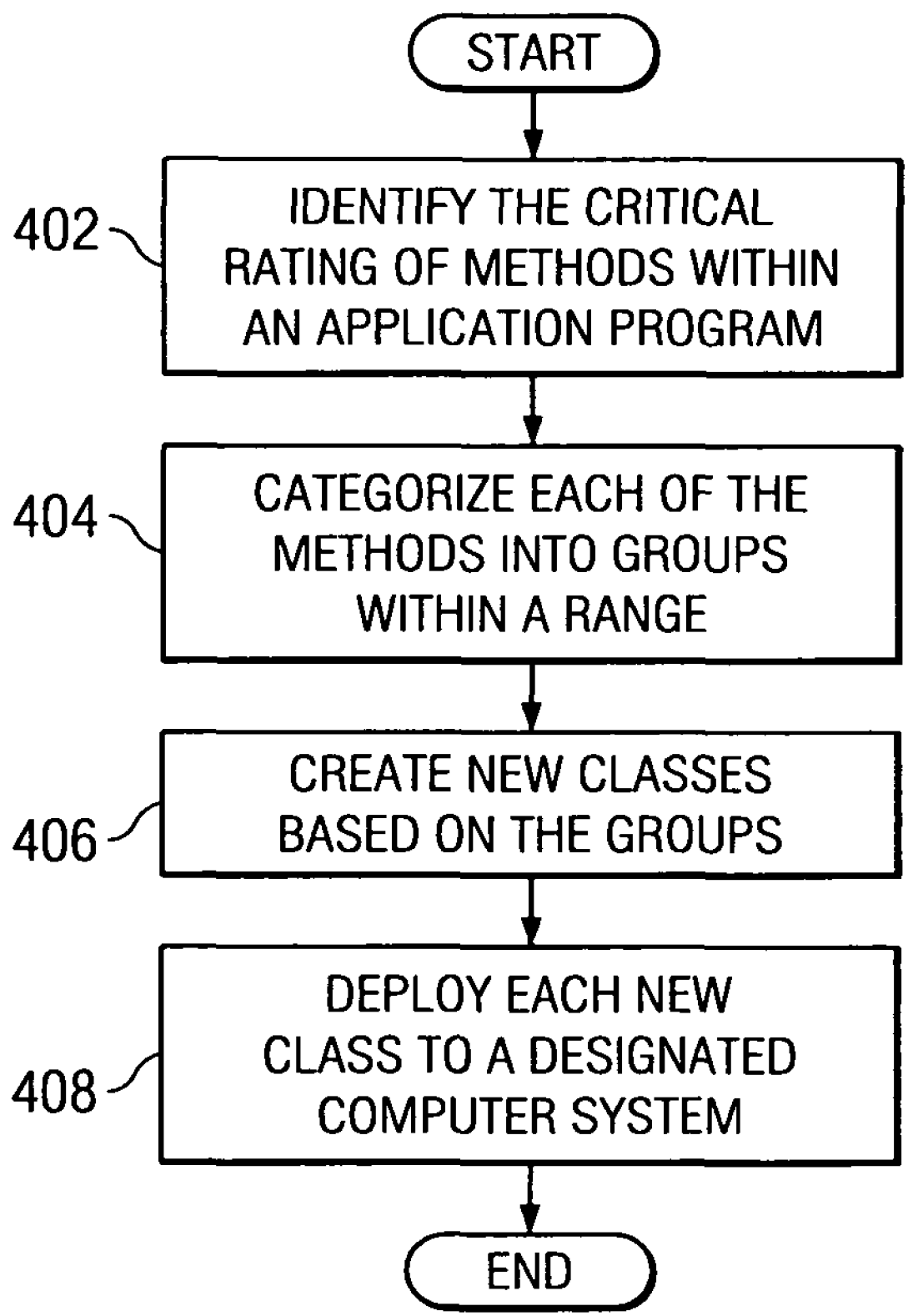
FIG. 4 is a flowchart illustrating application method refactoring in accordance with an illustrative embodiment of the present invention.

FIG. 4 is a flowchart illustrating application method refactoring in accordance with an illustrative embodiment of the present invention. The process described in FIG. 4 may be implemented on a computing device, such as client 112 or server 104 of FIG. 1 by deployment manager software, such deployment manager software 302 of FIG. 3.

The process begins by identifying the critical rating of methods within an application program (step 402). The application program may be one or more applications, such as application A 304, application B 306, and application C 308 of FIG. 3. The method may be one or more methods, such as method 1 328 and method 2 332 of FIG. 3, and the critical rating may be one or more critical ratings, such critical rating 330 and critical rating 334 of FIG. 3. The process may begin in response to one or more applications being deployed or loaded for execution.

Next, the process categorizes each of the methods into groups within a range (step 404). The range may define the lowest possible critical rating to the highest possible critical rating. The groups may be a numerical division within the range of the critical ratings. Each method which has a critical rating that fits a group's numerical division or description may be categorized or classified to that group. The number of groups may be based on the number of computing devices or servers that are available to process the different methods.

For example, if there are only two servers, one for methods with a high critical rating and the other for methods with a low critical rating, the methods of the applications are categorized into two groups. If the range of critical ratings is between 1 and 10, all methods with a high priority of 6-10 are categorized in a group for the server dedicated for highly critical methods. The methods with a low priority of 1-5 are categorized in a group for the server dedicated for low criticality methods.

Next, the process continues by creating new classes based on the groups (step 406). The new classes created by deployment manager software may be one or more new classes, such as new class 1 310 or new class 2 312 of FIG. 3 that are based on the groups categorized in step 404. The new classes may include a new critical rating. For example, the critical rating of the new class may be the average value of ratings of the methods within the new class. The process next deploys each new class to a designated computer system (step 408) with the process terminating thereafter. The computer system may be one or more servers, such as server 1 316 or server 2 318 of FIG. 3. The designated computer server may be selected based on the new critical rating assigned to each new class. Each server may also have a critical rating. For example, the critical rating of the server may indicate that the server is designated for methods with a high critical rating or methods with a low critical rating.

In one illustrative example, WebApp.ear, an application, is deployed. The deployment manager software identifies each method and the respective critical rating including doTransaction( ) critical rating 100, validate Address( ) critical rating 5, login( ) critical rating 95, and get Stock Symbol( ) critical rating 10. The deployment manager software refactors the methods into two new groupings/new classes, WebApp1.ear and WebApp2.ear based on the critical ratings. WebApp1.ear includes doTransaction( ) and login( ) because of the higher identified critical ratings. WebApp2.ear includes validateAddress( ) and getStockSymbol( ) because of the lower identified critical ratings.

New critical ratings are calculated by taking the average of the rating values of the methods within each new class. WebApp1.ear's new critical rating is 97. WebApp2.ear's new critical rating is 7. The deployment manager software then deploys the new classes based on the new designated critical ratings to the servers with the appropriate critical rating. Server A is designated to take new classes with a critical rating of 51 or greater and Server B is designated to take new classes with a critical rating of 50 or lower. As a result, WebApp1.ear is deployed to server A and WebApp2.ear is deployed to server B.

Aspects of the present invention allow refactoring of methods in an application to dynamically increase performance. Methods within a set of one or more applications are categorized into groups based on the critical rating of each method. Each group is used to create a new class with a new critical rating assigned each new class based on the average of the rating values of the methods assigned to the new class. Each new class is then deployed to a server or other computing device based on the critical rating assigned the new class. As a result, highly critical methods or methods with increased priority are given true priority and distinction that is unavailable when the critical rating of an entire application is used to distinguish processing priority.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of refactoring methods of an application, the method comprising:
    identifying a rating for a method within a first application to form a rated method, wherein the method comprises a callable section of code within a class or an object used to perform a specified task, and wherein the rating describes a priority of an element expressed in a form of a critical rating;
    placing the rated method in a grouping based on the rating identified for the method;
    designating a first data processing system in a plurality of data processing systems to process the grouping, wherein the grouping contains other methods having a selected rating within a range of ratings, wherein other methods are selected from a second application;
    deploying the grouping to the first data processing system;
    responsive to placing the rated method in the grouping based on the rating identified for the method, creating a new class from the grouping, wherein calculating a rating for the new class further comprises:
        calculating the rating for the new class based on an average of rating values of a plurality of methods within the grouping grouped within the new class;
    designating a second data processing system in the plurality of data processing systems to process the new class based on the rating for the new class;
    updating, at the first data processing system, metadata for the method in the new class containing an identity of the second data processing system and call routing information for routing a future call to the method to the second data processing system; and
    deploying the new class to the second data processing system of the plurality of data processing systems, wherein deploying each new class to a data processing system based on the rating for the class allows refactoring of methods in an application to dynamically increase performance.

2. The method of claim 1, wherein the call routing information is an entry for the method in a directory of methods in the first application.

3. The method of claim 1, wherein the step of identifying the rating for the method within the first application to form the rated method comprises:
    extracting the method from byte code representing compiled source code for the application; and
    updating a plurality of references to the method such that the future call is routed to the second data processing system.

4. A computer program product stored on a recordable-type non-transitory computer useable medium for refactoring methods of an application, comprising:
    computer useable program code for identifying a rating for a method within a first application to form a rated method, wherein the method comprises a callable section of code within a class or an object used to perform a specified task, and wherein the rating describes a priority of an element expressed in a form of a critical rating;
    computer useable program code for placing the rated method in a grouping based on the rating identified for the method;
    computer useable program code for designating a first data processing system in a plurality of data processing systems to process the grouping, wherein the grouping contains other methods having a selected rating within a range of ratings, wherein other methods are selected from a second application;
    computer useable program code for deploying the grouping to the first data processing system;
    computer useable program code for responsive to placing the rated method in the grouping based on the rating identified for the method, creating a new class from the grouping, wherein computer useable program code for calculating a rating for the new class further comprises:
        computer useable program code for calculating the rating for the new class based on an average of rating values of a plurality of methods within the grouping grouped within the new class;
    computer useable program code for designating one of a plurality of data processing systems to process the new class based on the rating for the new class;
    computer useable program code for updating, at the first data processing system, metadata for the method in the new class containing an identity of the second data processing system and call routing information for routing a future call to the method to the second data processing system; and computer useable program code for deploying the new class to one of the plurality of data processing systems, wherein deploying each new class to a data processing system based on the rating for the class allows refactoring of methods in an application to dynamically increase performance.

5. The computer program product of claim 4, wherein the call routing information is an entry for the method in a directory of methods in the first application.

6. The computer program product of claim 4, wherein the computer useable program code for identifying the rating for the method within the first application to form the rated method comprises:

computer useable program code for extracting the method from byte code representing compiled source code for the application; and computer useable program code for updating a plurality of references to the method such that the future call is routed to the second data processing system.

7. An apparatus for maintaining user viewing of particular content, comprising:

a bus system;

a communications system coupled to the bus system;

a memory connected to the bus system, wherein the memory includes computer useable program code; and a processing unit coupled to the bus system, wherein the processing unit executes the computer useable program code to identify a rating for a method within a first application to form a rated method, wherein the method comprises a callable section of code within a class or an object used to perform a specified task, and wherein the rating describes a priority of an element expressed in a form of a critical rating; to place the rated method in a grouping based on the rating identified for the method; to designate a first data processing system in a plurality of data processing systems to process the grouping, wherein the grouping contains other methods having a selected rating within a range of ratings, wherein other methods are selected from a second application; to deploy the grouping to the first data processing system; to create a new class from the grouping, responsive to placing the rated method in the grouping based on the rating identified for the method wherein calculating a rating for the new class further comprises calculating the rating for the new class further comprising calculating the rating for the new class based on an average of rating values of a plurality of methods within the grouping grouped within the new class, designating a second data processing system in the plurality of data processing systems to process the new class based on the rating for the new class, update, at the first data processing system, metadata for the method in the new class containing an identity of the second data processing system and call routing information for routing a future call to the method to the second data processing system; and deploying the new class to the second data processing system of the plurality of data processing systems, wherein deploying each new class to a data processing system based on the rating for the class allows refactoring of methods in an application to dynamically increase performance.

8. The apparatus of claim 7, wherein the call routing information is an entry for the method in a directory of methods in the first application.

9. The apparatus of claim 7, wherein the processing unit executing the computer useable program code to identify the rating for the method within the first application to form the rated method comprises the processing unit executing the computer usable program code to extract the method from byte code representing compiled source code for the application, and update a plurality of references to the method such that the future call is routed to the second data processing system.

* * * * *